INVENTOR.
Robert C. Stutz
BY
Popp and Sommer
ATTORNEYS.

Jan. 22, 1957  R. C. STUTZ  2,778,782
METHOD AND APPARATUS FOR CONCENTRATING AQUEOUS
SOLUTIONS OF HYGROSCOPIC ORGANIC SUBSTANCES
Filed Aug. 15, 1951  2 Sheets-Sheet 1

INVENTOR.
BY
ATTORNEYS.

INVENTOR.
Robert C. Stutz
BY
Popp and Sommer
ATTORNEYS.

United States Patent Office 2,778,782
Patented Jan. 22, 1957

2,778,782

METHOD AND APPARATUS FOR CONCENTRATING AQUEOUS SOLUTIONS OF HYGROSCOPIC ORGANIC SUBSTANCES

Robert C. Stutz, Buffalo, N. Y., assignor to Niagara Blower Company, New York, N. Y., a corporation of New York Application August 15, 1951, Serial No. 241,999

6 Claims. (Cl. 202—46)

This invention relates to a method and apparatus for concentrating aqueous solutions of hygroscopic organic substances having boiling points higher than the normal boiling point of water, and more particularly organic substances such as the polyhydroxy organic compounds, such as glycerol and the polyglycerols typified by triethylene glycol, used to dehumidify air as described in the Spiselman Patent 2,367,695 or used as an antifreeze medium in spray coolers for air where the concentration of the substances are lower than when used for dehumidifying air.

As set forth in the said Spiselman patent, very efficient concentration of such hygroscopic organic substances can be effected by passing a current of carrier gas such as air over an extended surface of the solution to be concentrated while maintaining the solution at a relatively low temperature, for example, from a temperature above the initial dewpoint of the current of gas to the normal boiling point of water, that is, 212° F. Within this range of temperatures the ratio of the amount of water evaporated to the amount of organic substance evaporated is at a maximum, the preferred temperature of evaporation within this range varying with the concentration of the organic substance and the moisture content of the carrier gas available for use in the process. Utilizing atmospheric air of the moisture content normally obtaining in the summertime, for the concentration of such organic solutions as are used as an antifreeze medium in spray coolers for air, that is, concentrations in the order of 50% entering the concentrator and 60% leaving the concentrator, the temperature to which the solutions are heated in the concentration operation are advantageously from 100° to 150° F.

One of the principal objects of the invention is to provide such concentrating method and apparatus in which the concentration is effected without substantial loss of the hygroscopic organic substance.

Another object is to provide such a method and apparatus which operates at a relatively low temperature, this being particularly important where refrigeration apparatus is involved, a saving in refrigeration resulting from the return of relatively low temperature concentrate to the cooling apparatus.

Another object is to provide such apparatus which avoids the use of packings of ceramic bodies or elaborate baffle systems to provide the extended surface contact required between the solution and the carrier gas, the requisite contact being obtained in the practice of the present invention by recirculating the solution from a body of the solution through a spray tree from the nozzles of which the solution falls or is projected directly back to the body of solution.

Another object is to provide such a method which is inexpensive to operate, particularly in point of use of heating and cooling media for obtaining evaporation and reflux condensation, respectively, relatively low temperatures being used to effect evaporation of the water component from the sprays into the current of air, and the incoming air subsequently used to effect this evaporation being used for the reflux condensing.

Another object is to provide such apparatus which is very simple and inexpensive.

Another object is to provide such apparatus which is readily accessible for inspection or repairs and which is free from service difficulties and will stand up under conditions of severe and constant use without getting out of order and without requiring adjustment or repairs.

Another object is to avoid the use of fans or blowers to propel the air through the apparatus.

Another object is to provide such apparatus which is extremely compact and at the same time is of high capacity.

Another object is to provide such a method and apparatus in which the dilute solution is fed to the apparatus at a constant rate for optimum performance of the process and by a feed device which is not likely to foul up or alter its rate of feed, this being particularly important where in use the concentrated solution is sprayed into an air stream from which it can pick up a wide variety of contaminants.

Another object is to provide such a method and apparatus which in addition to being economical in operation has a uniform high capacity and is sure in its operation so as to avoid the necessity for constant attention or observation of its operation.

Other objects and advantages of the invention will be apparent from the following description and drawings in which.

Figure 1:
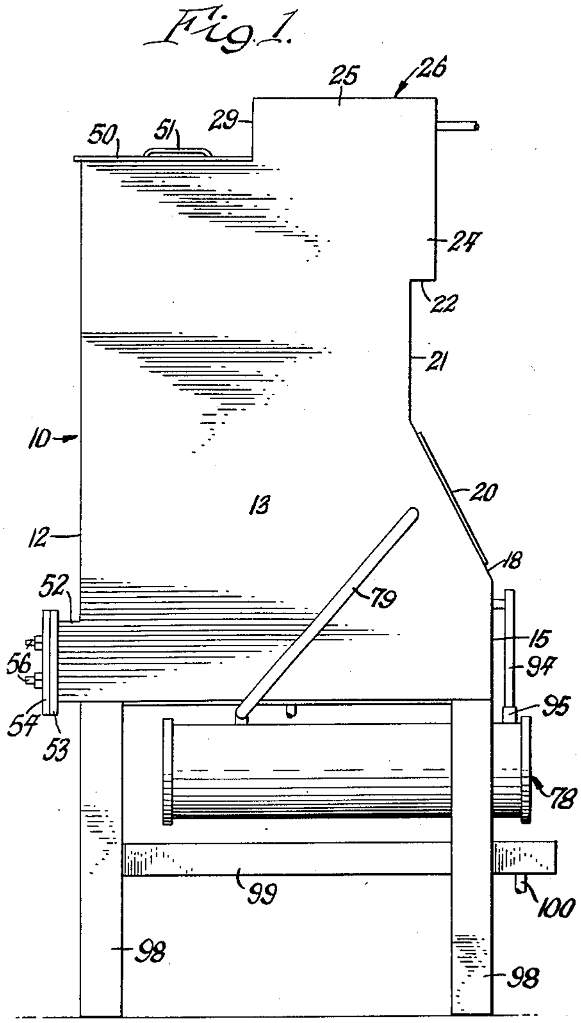
Fig. 1 is a side elevational view of apparatus embodying and adapted to carry out the present invention.
Figure 2:
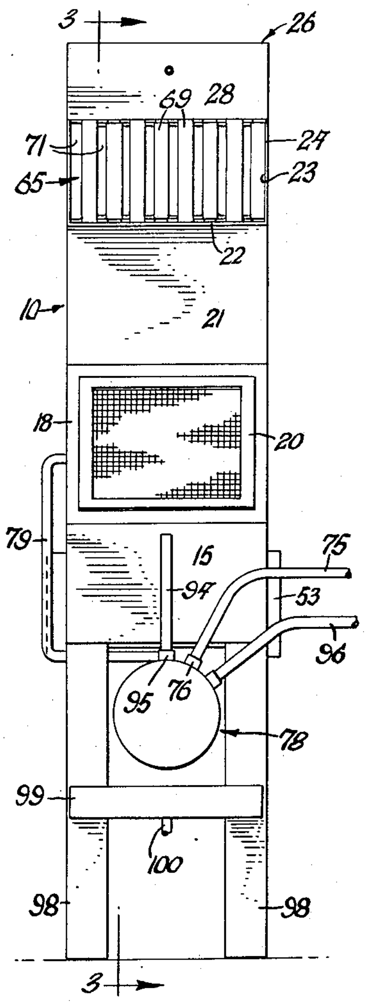
Fig. 2 is a front elevational view thereof.

The method and apparatus forming the subject of the present invention is shown as practiced and embodied in the apparatus shown in the accompanying drawings in which the numeral 10 represents a sheet metal casing composed of a rectangular bottom 11, a rear wall 12, counterpart side walls 13 and a front wall. This front wall is composed of a lower rectangular vertical part 15 which forms with the bottom 11, rear wall 12 and side walls 13 a reservoir or sump 16 adapted to contain a body 17 of the aqueous solution to be concentrated. Above the lower section 15 of the front wall, this front wall includes a section 18 which inclines upwardly and rearwardly and is provided over substantially its entire area with an access opening 19. This access opening can be provided with a readily movable screened frame 20, the screening permitting visual inspection of the interior of the casing through the opening 19 and being readily removable to provide access for cleaning, adjustment or repairs. The front wall also includes an upper vertical rectangular section 21 which rises from the upper edge of the inclined section 18 to a point short of the top of the casing. The upper edge of this upper section 21 of the front wall is flanged outwardly, as indicated at 22, to form the bottom of a rectangular air inlet opening 23, the sides of which are formed by forward extensions 24 of the side walls 13 of the casing. The side walls 13 adjacent this air inlet opening 23 are also continued upwardly to form the side walls 25 of an upwardly discharging air exhaust duct or stack 26. The front wall of this air exhaust duct or stack is formed by a rectangular plate 28 which also forms the upper wall of the air inlet opening 23. The rear wall of this air exhaust duct 26 is formed by a rectangular plate 29 secured at its vertical edges to the rear vertical edges of the upward extensions 25.

The upwardly discharging air exhaust duct or stack 26 is provided internally with a rectangular condensate trap 30. The purpose of this trap is to catch any water condensing and flowing down the duct work (not shown) to which the air discharge duct or stack 26 may be connected. This condensate trap is shown as being in the form of a simple rectangular frame secured within the air exhaust duct 26 and composed of a strip of metal 31 projecting outwardly and upwardly from the interior face of each of the walls 25, 28 and 29 of the air exhaust duct and joined at their ends to provide a rectangular trough 37 around the interior of the air exhaust duct.

The interior of the casing is divided into a downflow air pass 32 and an upflow air pass 33 by a vertical central partition 34 secured at its ends to the side walls 13 and arranged parallel with the rear wall 12 of the casing. The upflow pass 33 is in line with the air exhaust duct 26 and for this purpose it is arranged in line with the rear wall 29 of this vertical air exhaust duct 26. A feature of the invention also resides in the spacing of the upper edge of this vertical central partition 34 from the top of the casing and horizontally in line with the bottom 22 of the air inlet opening 23.

A second internal partition is formed by a downward continuation 35 of the upper vertical rectangular section 21 of the front wall. From the line of juncture between this upper vertical section 21 and the inclined section 18 of the front wall of the casing this partition extends downwardly and rearwardly, as indicated at 36, and thence vertically downwardly, as indicated at 38, the lower edge of this partition terminating below the level of the body 17 of solution contained within the bottom or sump 16 of the casing. This partition 35 forms with the front wall of the casing a chamber 39 in which an electric pump unit 40 is housed. The inlets 41 of this electric pump unit are submerged in the body of solution 17 and its outlet line extends rearwardly in a horizontal direction through the partition 35 to the center of the downflow pass 32. As the center of this downflow pass the pump outlet line 42 projects vertically upwardly in the downflow pass to supply solution to a spray tree 44 in this downflow air pass. This spray tree is shown as formed by a suitable number of upper branches 45 carrying downwardly discharging nozzles 46 and by a suitable number of lower branches 48 which carry nozzles 49. These branches 48 and nozzles 49 are disposed so that the nozzles discharge in the direction of flow of the air stream and since the air stream at this location is moving downwardly and forwardly in entering the upflow pass 33, the branches 48 are preferably arranged at the inclination shown.

The top of the downflow pass 32 is preferably covered by a removable cover 50 having a handle 51 and below this downflow air pass the bottom 11, side walls 13, and rear wall 12 are preferably extended rearwardly to provide a rectangular neck 52 which is disposed below the level of the body 17 of solution contained in the bottom or sump 16 of the casing. This neck 52 is preferably provided with an outwardly projecting flange 53 around its rim and to this flange is removably secured a rectangular plate 54 which encloses the rear end of the sump 16. This plate also carries a suitable number of electrical immersion heaters 55, these being shown as being of hairpin form submerged in the body 17 of liquid and having their electric terminals 56 arranged exteriorly of the plate 54. While these heaters 55 are shown as being in the form of electrical resistance heaters, it will be apparent that other heating media could be employed, it being a feature of the invention, however, that these heaters 55 be in direct thermal contact with a body of solution being recirculated through the spray tree 44 either by being submerged in the body 17 or immersed in the solution being carried by the pump outlet line 42.

For proper heat exchange between the heaters 55 and the solution being recirculated through the body 17 of solution and the spray tree 44 means are provided to insure a flow of this solution through the body 17 lengthwise of these heaters. To this end a horizontal plate 58 is disposed above the heaters 55 and is secured at its opposite ends to the side walls 13 of the casing. This plate is submerged in the body 17 of liquid and at its forward end is provided with an upturned flange 59 which is arranged in closely spaced relation to the submerged lower end 38 of the partition 35. This flange 59 rises above the level of the body 17 of liquid and the rear edge of the horizontal plate 58 is spaced a substantial distance from the rear wall 12 of the casing, as indicated at 60. It will therefore be seen that the recirculating liquid discharged by spray nozzles 46, 49 against the body 17 of solution is compelled to first flow rearwardly along the top of the plate 58, thence downwardly through the opening 60, and thence forwardly the full length of the heaters 55 to the recirculation pump 40.

An important objective of the invention is to avoid the loss of the hygroscopic organic substance of the solution and to this end an air filter 61 is disposed across the upper end of the upflow pass 33 immediately below the level of the air inlet opening 23. The air filter is shown as having the conventional rectangular metal frame 62 fitted within the side walls of the upflow pass 33 and containing a body 63 of spun glass or other conventional fibrous filtering material. This air filter can be removably supported on brackets 64 or in any other suitable manner so that it can be readily removed through the air inlet opening 23 and replaced.

To further reduce the loss of the hygroscopic organic substance in the solution being concentrated, an important feature of the invention resides in an air-to-air heat exchanger, indicated generally at 65, between the incoming and outgoing air. The purpose of this air-to-air heat exchanger is to provide a reflux condenser for the vapor laden air leaving the apparatus so as to saturate completely the air with water vapor and thereby condense substantially all the organic substance from the air in the form of an aqueous solution thereof which flows back to the body 17 of solution in the bottom of the casing.

Figure 7:
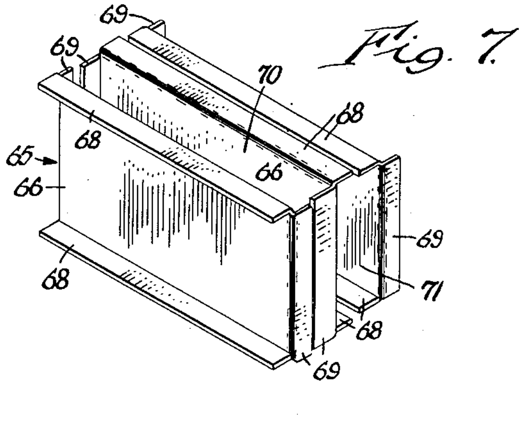
Fig. 7 is an exploded view of several of the plates of the air-to-air reflux condenser forming part of the apparatus.
Figure 3:
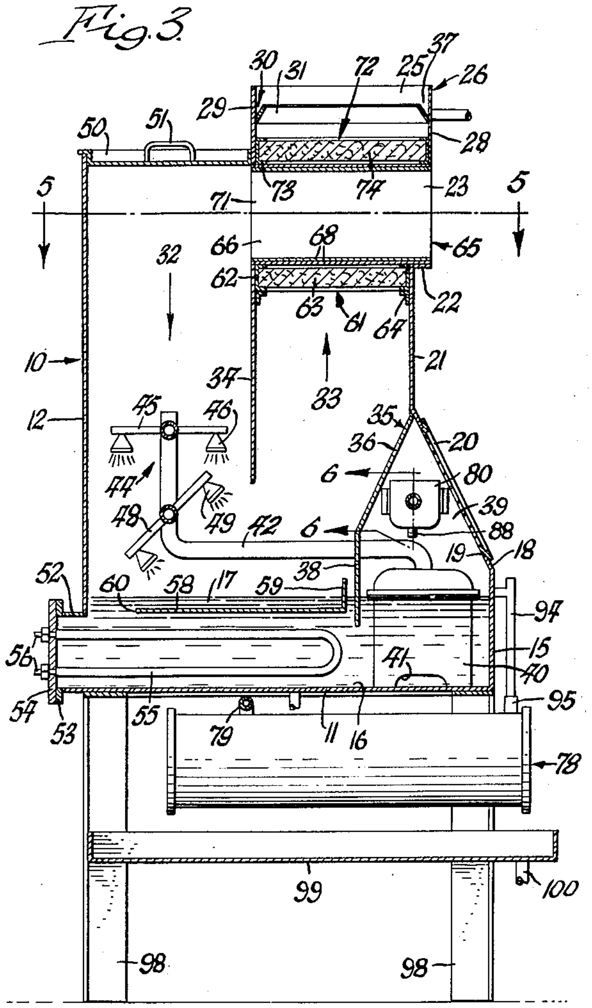
Fig. 3 is a vertical fore-and-aft section taken generally on line 3—3, Fig. 2.
Figure 4:
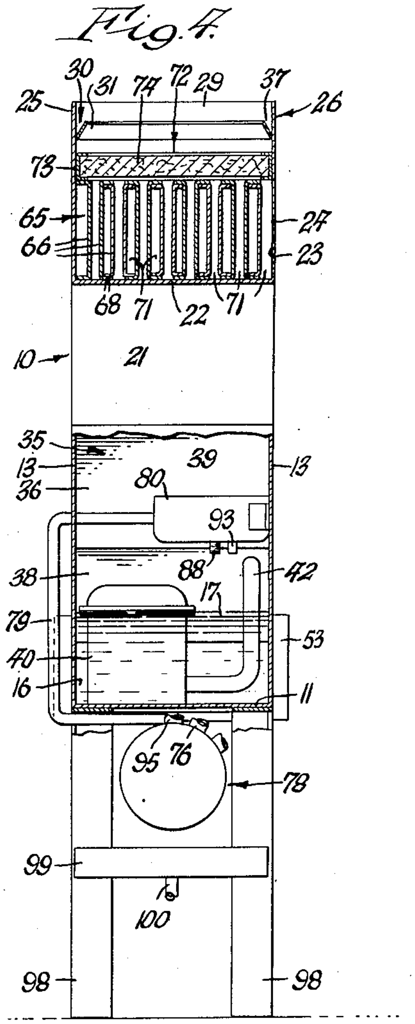
Fig. 4 is a view similar to Fig. 2 with parts broken away.
Figures 5, 6:
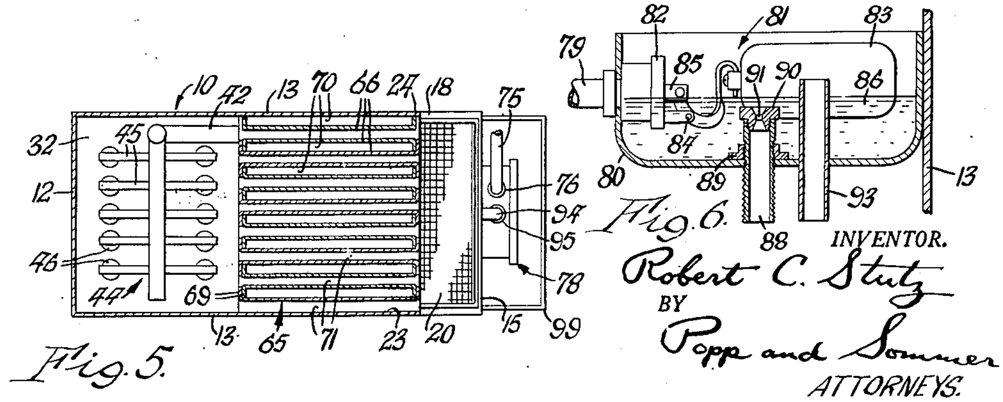
Fig. 5 is a horizontal section taken generally on line 5—5, Fig. 3.
Fig. 6 is an enlarged vertical section taken generally on line 6—6, Fig. 3.

For ready removability and cleaning this air-to-air heat exchanger, as best shown in Fig. 7, it is built up of a plurality of identical rectangular plates 66 which are loosely fitted together and inserted, through the air inlet opening 23, into the space above the filter 61. Each of these plates has horizontal flanges 68 along its upper and lower edges and projecting in the same direction. Each plate also has vertical flanges 69 along its opposite vertical edges and projecting in the opposite direction from the flanges 68. To build the air-to-air heat exchanger 65 all that is necessary is to interfit a suitable number of these plates 66 with their flanges 68, 68 and 69, 69 in overlapping relation, respectively. This provides vertical passages 70, as best shown in Figs. 5 and 7, for the leaving air flowing from the upflow pass 33 to the discharge stack 26. This also provides a plurality of intermediate horizontal passages 71, as best shown in Figs. 4 and 7, for the air entering the inlet opening 23 and flowing toward the upper end of the downflow pass 32. Normally the flanges 68, 68 and 69, 69 are not sealed together but are merely interfitted. The air passing through this heat exchanger is, of course, under no substantial pressure and hence possible leakage of the air-to-air heat exchanger is not an important factor.

To further minimize the loss of the hygroscopic organic substance as a part of the operation of the apparatus, a second air filter 72 is arranged in the exhaust air duct 26 above the air-to-air heat exchanger 65. This air filter is preferably identical, except for size, with the filter 61, being composed of a rectangular frame 73 fitted in the air exhaust duct 26 and containing a body 74 of fibrous material, such as spun glass.

The cold dilute solution to be concentrated is fed to the apparatus from a dilute solution inlet line 75. This dilute solution inlet line 75 leads to the inlet nipple 76 of a heat exchanger 78 and which is preferably constructed as described in detail in the co-pending application of Robert C. Stutz, Serial No. 194,606, filed November 8, 1950, now United States Patent No. 2,661,934, dated December 8, 1953, for Liquid-to-Liquid Heat Exchanger and to which reference is made for a more detailed showing of this heat exchanger 78.

After passing in heat exchange relation with the hot concentrated solution leaving the apparatus through this heat exchanger 78, this dilute entering solution leaves the heat exchanger 78 through the line 79 which terminates in a small tank 80 mounted in the upper part of the chamber 39 within the casing of the apparatus. As best shown in Fig. 6, the discharge of the liquid from the line 79 into the tank 80 is under control of a float valve 81 of any conventional form, this float valve being shown as having a valve body 82 secured to the end of the pipe 79 and a float 83 pivoted to the body 82 at 84 and actuating a control member 85 which closes the float valve 81 when the level of the body of liquid 86 within the small tank rises to a predetermined level.

The purpose of the float valve 81 and its associated parts is to insure a uniform feed of the dilute liquid at a constant rate to the body of solution 17 in the sump 16 at the bottom of the casing 10. To this end an externally threaded vertically adjustable pipe 88 extends through the bottom of the small tank 80 and screws into an internally threaded collar 89 on the bottom of the small tank so that by turning the threaded pipe 88 its elevation can be adjusted. An end head 90 is screwed into the upper end of the adjustable pipe 88 and is provided with a vertical orifice 91 of predetermined size. With a constant level of the body of dilute solution 86 being maintained by the float valve 81; with the orifice 91 of fixed predetermined size; and with the head 90 maintained at a set elevation, the rate of flow of liquid from the small tank or reservoir 80 is maintained constant with a very high degree of accuracy. This liquid flows from the vertically adjustable pipe 88 directly into the body of solution 17 contained in the sump or bottom 16 of the main casing 10, as best shown in Fig. 4. In the event the float valve 81 fails to maintain the desired level, an overflow pipe 93 is also provided in the small tank or reservoir and also discharges into the main body of solution 17.

The concentrated solution leaves the body 17 of solution through an overflow pipe 94, the upper end of which extends through the lower section 15 of the front wall of the casing and extends thence downwardly to the hot liquid inlet nipple 95 of the heat exchanger 78. This hot return concentrated solution passes in heat exchange relation with the cold entering dilute solution and leaves the heat exchanger 78 through the concentrated liquid return line 96.

The apparatus as above described is shown as supported on legs 98 and a drain pan 99 is shown as supported by these legs below the entire casing 10 and also the heat exchanger 78, the purpose of this drain pan being to catch any solution which escapes for any reason. This drain pan is shown as provided with the usual drain pipe 100.

*Operation*

The apparatus as above described is primarily directed to the economical concentration of aqueous solutions of hygroscopic organic substances, such as the higher alcohols, and which substances have boiling points higher than the normal boiling point of water, the primary object being to effect such concentration economically without substantial loss of the substance and without undue supervision of the apparatus or the processing. The concentrations of the hygroscopic organic substance can be high, such as above 85% when the solution is used as a hygroscopic solution for dehumidifying air as described in the said Spiselman Patent 2,367,695, or it can be very considerably lower, such as 50% or less when the organic substance is used merely as an antifreeze medium in spray coolers where air is passed through a spray chamber and over refrigerated coils which are prevented from icing up by a recirculation of the solution through sprays directed against these coils and into the air stream.

In either use, the solution of the hygroscopic organic substance becomes dilute and must be reconcentrated in order to preserve its hygroscopic or antifreeze properties. This dilute solution leaves the apparatus being served and enters the inlet line 75 of the concentrator and passes in heat exchange relation with the hot leaving concentrated solution passing through the heat exchanger 78. The dilute solution so preheated in the heat exchanger 78 leaves the heat exchanger through the line 79 (Figs. 1 and 4) and enters the small tank or reservoir 80 contained within the main casing 10 immediately behind the access opening 19. This flow of the dilute solution to the small tank or reservoir 80 is under the control of the float valve 81 (Fig. 6) which serves to maintain a predetermined level of the body 86 of dilute solution within this small tank or reservoir. This liquid escapes through the fixed orifice 91 which is adjustable as to height by turning the externally threaded vertically adjustable pipe 88 in which it is mounted. This pipe feeds directly into the body 17 of solution in the bottom or sump 16 of the casing 10. Since the level of the body 86 is maintained constant by the float valve 81; since the orifice 91 is of fixed predetermined size; and since the elevation of this orifice is adjusted to provide the rate of flow desired, the rate of discharge of the dilute solution from the small tank or reservoir 80 into the main body 17 of this solution in the bottom or sump 16 of the casing 10 is held constant with a very high degree of accuracy.

The body 17 of liquid in the bottom or sump 16 of the casing 10 is continuously being recirculated through the spray tree 44 and at the same time is heated by the electrical resistance immersion heaters 55 submerged in the body 17 of solution. Thus, the electric motor driven pump 40 withdraws solution from the body 17 through its inlets 41 and discharges this liquid through its outlet pipe 42 and the nozzles 46, 49 of the spray tree 44 downwardly in the downflow pass 32 and against the surface of the body of solution 16. The solution so discharged from the nozzles 46, 49 is prevented from flowing directly back to the motor driven pump unit 40 by the submerged baffle plate 58 and its upstanding flange 59, this baffle plate compelling the liquid from the sprays to pass through the opening 60 between this baffle and the rear wall 12 of the casing and thence forwardly below the baffle plate 58 and in heat exchange relation with substantially the full length of the immersion heaters 55 before returning to the inlet of the motor driven pump unit 40.

A feature of the invention resides in the arrangement of the nozzles 46, 49 of the spray tree 44 so as to effect movement of a stream of air through the apparatus without requiring blowers or other devices for this purpose. Thus the nozzles 46 are directed downwardly and the nozzles 49 are directed angularly toward the opening between the lower ends of the downflow pass 32 and the upflow pass 33. Accordingly, these nozzles induce a slow flow of fresh outside air from the inlet opening 23 in the front of the apparatus horizontally through the horizontal passages 71 of the air-to-air heat exchanger or reflux condenser 65 from which the air flows into the upper end of the downflow pass 32. This slow air movement induced by the sprays results in the air stream being highly saturated with water vapor, such high degree of saturation leaving little capability of the air to absorb vapor of the hygroscopic organic substance and thereby insuring a high ratio of water evaporation to evaporation of the organic substance. The sprays from the nozzles 46, 49 induce a downward flow of this air in this downflow pass 32, this air flowing under the central partition 34 and into the lower end of the upflow pass 33. The air flows up this upflow pass 33 and leaves this upflow pass through the air filter 61 which serves to remove any entrained solution from the air. The air leaving this air filter 61 passes through the vertical passages 70 of the air-to-air heat exchanger or reflux condenser 65 and thence passes upwardly through the second air filter 72 and out through the vertical exhaust duct or stack 25 from which it can be returned to the outside in any suitable manner.

The heated solution discharged from the nozzles 46, 49 into the stream of fresh air moving down the downflow pass 32 operates to transfer to the stream of air mixed vapors of water and the hygroscopic organic substance, but principally water vapor, so that the excess solution discharged from these nozzles and returning directly to the body of solution 17 is concentrated with respect to the hygroscopic organic substance. This heated spray water also heats the passing air stream thereby to permit it to absorb a greater quantity of water vapor. It will therefore be seen that the sprays from the nozzles 46, 49 operate both to effect an initial concentration of the solution and a separation of this concentrated solution from the air stream, this separation being effected by the return of the unevaporated portion of the spray liquid to the body 17 of solution in the bottom or sump of the casing. It has been found that such recirculation of the solution to be concentrated through the sprays provides the necessary large area of contact between the solution and the stream of gas without resorting to packings of ceramic shapes or a system of baffles for this purpose.

The stream of air so containing mixed vapors of the water and hygroscopic organic substance, but principally of water vapor, then passes through the air filter 61. This air filter serves to remove entrained solution from the air stream, which removed entrained solution flows back to the body of solution 17 thereby to prevent loss of the organic substance through the escape of entrained solution. The heated air with the mixed vapors of water and hygroscopic organic substance then passes upwardly through the vertical passages 70 of the air-to-air heat exchanger or reflux condenser 65. Accordingly, the hot vapor-laden air is passed in heat exchange relation with the cool incoming air, in consequence of which the hot vapor-laden air is cooled below its dewpoint so as to saturate completely the vapor-laden air with water and to condense substantially all the hygroscopic organic substance from the vapor-laden gas in the form of an aqueous solution thereof. This condensate, so containing a substantial percentage of the hygroscopic organic substance, flows down the sides of the plates 66 and through the air filter 61 back to the body of liquid 17 in the bottom or sump 16 of the casing. On leaving the reflux air-to-air condenser 65 the saturated air stream passes through the air filter 72. This air filter, composed of loosely packed fibrous material, has been found to remove further traces of the hygroscopic organic substance from the saturated air stream so that the moist air leaving the vertical exhaust duct or stack 25 contains at most a mere trace of the hygroscopic organic substance.

Since the excess water sprayed from the nozzles 46, 49, that is, the portion which does not evaporate into the air stream, is concentrated due to such evaporation being principally in the form of water vapor rather than the higher boiling point hygroscopic organic substance, the concentration of the body 17 of liquid in the bottom or sump 16 of the casing is increased by its continuous recirculation through the spray nozzles 46, 48 and by continuously being moved past the electric heaters 55. Since dilute solution is being introduced at a constant rate under control of the float valve 81 and the fixed orifice 90 at a fixed elevation, the body 17 of liquid in the bottom or sump 16 of the casing 10 continuously overflows through the overflow pipe 94 and returns to the inlet nipple 95 of the liquid-to-liquid heat exchanger 78. This hot concentrated liquid flows through this heat exchanger 78 in heat exchange relation with the cool entering dilute solution and passes from the heat exchanger 78 through the concentrated solution return line 96 to the apparatus being served.

It will particularly be noted that in the practice of the present invention the solution to be concentrated is continually being recirculated through the spray tree 44 and past the submerged heaters 55 by the recirculation pump unit 40. By such recirculation, the sprays issuing from the spray nozzles 46, 49 can be strong enough both to bring the air stream close to its point of saturation with the mixed vapors of the water and hygroscopic organic substance and also to act as a propellant for inducing the flow of air through the apparatus. In bringing the air close to its saturation point with the mixed vapors of water and hygroscopic organic substance, a larger proportion of these mixed vapors are in the form of water vapor so that a more effective concentration of this solution and separation of the organic component is obtained at the sprays. Further, by so bringing the air stream close to its point of saturation with the mixed vapors of water and hygroscopic organic substance little cooling is required in the reflux condenser 65 to lower the temperature of the stream of air below its dewpoint and to thereby effect condensation of the hygroscopic organic substance from the vapor laden air stream. As a consequence with this combination it is possible to use an air-to-air heat exchanger for the reflux condenser 65 and it is also possible to use, as the cooling medium for this reflux condenser, the fresh air admitted to the apparatus thereby to effect not only an economy in heat consumption but also to avoid the cost and inconvenience of using other cooling media.

It will also be seen that with the apparatus as above described the submerged heaters 55 require little service both because they are completely surrounded by the solution to be heated and also because the arrangement of the parts, particularly the baffle 58, 59, compels recirculatory movement of the liquid the full length of these heaters.

It will further be noted that the apparatus is very accessible, the float valve-orifice feed control 81, 91, as well as the electric motor driven pump unit 40 being accessible by the mere removal of the screen frame 20; the plates 66 of the air-to-air reflux condenser 65 being readily removable through the air intake opening 23, the air filters 61, 72 being thereafter readily removable through this same air intake opening 23; the spray nozzles 46 being readily accessible by removing the cover 50 forming the upper wall of the down pass 32; and the electric immersion heaters 55 being also readily removable by removing their mounting plate 54. Further, as set forth in detail in the said co-pending Stutz application, Serial No. 194,606, the heat exchanger 78 is likewise readily accessible for the purpose of cleaning the same, this heat exchanger also serving to collect sediment which has been found to form with apparatus where the concentrated liquid is sprayed into an air stream as is usually the case.

Accordingly, it will be seen that the invention achieves the various advantages and objectives as set forth. While the invention has been particularly described as using air as the carrier gas, it will be appreciated that other gases could be used.

I claim:

1. A method of concentrating aqueous solutions of hygroscopic organic substances having boiling points higher than the normal boiling point of water without substantial loss of the substance, which comprises maintaining a body of said solution, withdrawing a stream of said solution from said body, spraying said withdrawn stream into a stream of gas to transfer from said sprayed solution to said stream of gas mixed vapors of water and said substance whereby the excess solution sprayed into said stream of gas is concentrated in the sprayed droplets projected by said sprays, and returning said droplets substantially directly to said body for recirculation through the sprays provided by so spraying said withdrawn stream of solution, heating said sprayed and recirculated stream of solution to a temperature above the initial dewpoint temperature of said stream of gas and not substantially higher than the normal boiling point of water, passing the stream of gas containing said mixed vapors in indirect heat exchange relation to the stream of gas prior to having the solution sprayed therein thereby to cool said stream of gas containing said mixed vapors to a temperature at which it is completely saturated with water vapor thereby to condense substantially all said substance from the gas in the form of an aqueous solution thereof, and returning the aqueous solution of the substance so condensed from the water vapor saturated gas to said body.

2. A method of concentrating aqueous solutions of hygroscopic organic substances having boiling points higher than the normal boiling point of water without substantial loss of the substance, which comprises maintaining a body of said solution, withdrawing a stream of said solution from said body, spraying said withdrawn stream into a body of gas with sufficient force to propel said gas as a stream and to transfer to said stream of gas mixed vapors of water and said organic substance whereby the excess solution so sprayed is concentrated in the sprayed droplets projected by said sprays, and returning said droplets substantially directly to said body for recirculation through the sprays provided by so spraying said withdrawn stream of solution, heating said sprayed and recirculated stream of solution to a temperature above the initial dewpoint temperature of said stream of gas and not substantially higher than the normal boiling point of water, passing the stream of gas containing said mixed vapors in indirect heat exchange relation to the stream of gas prior to having the solution sprayed therein thereby to cool said stream of gas containing said mixed vapors to a temperature at which it is completely saturated with water vapor thereby to condense substantially all the organic substance from the gas in the form of an aqueous solution thereof, and returning the aqueous solution of the organic substance so condensed from the water vapor saturated gas to said body.

3. A concentrator for concentrating aqueous solutions of hygroscopic organic substances having boiling points higher than the normal boiling point of water without substantial loss of the substance, which comprises a casing through which a stream of air is adapted to be propelled and having a sump arranged to contain a body of the solution to be concentrated, a spray nozzle in said casing above said sump and arranged to discharge said solution into the air stream passing through said casing for evaporation from the droplets projected into said stream of air by said nozzle; with said droplets discharged by said spray nozzle being collected in said sump, a liquid pump having its inlet connected with said sump and its outlet connected with said spray nozzle to recirculate a stream of said solution through said spray nozzle and sump, means arranged to supply a stream of the dilute solution to be concentrated to the solution being recirculated by said pump, a heater arranged to heat the solution to a temperature above the initial dewpoint temperature of said stream of gas and not substantially higher than the normal boiling point of water whereby the spray from said nozzle transfers by evaporation mixed vapors of water and said substance to said stream of air and thereby concentrates with respect to said substance the portion of said spray not evaporating, and an air-to-air heat exchanger arranged to conduct the portions of said stream of air entering and leaving said casing through opposite sides of said heat exchanger in indirect heat exchange relation to each other thereby to heat the stream of air entering said casing and to cool the stream of air leaving said casing below its dewpoint thereby to condense substantially all the substance from the leaving air in the form of an aqueous solution thereof.

4. A concentrator for concentrating aqueous solutions of hygroscopic organic substances having boiling points higher than the normal boiling point of water without substantial loss of the substance, which comprises a casing containing a gas and having a sump arranged to contain a body of the solution to be concentrated, a liquid pump having its inlet connected with said body of solution, a spray nozzle connected with the outlet of said pump and arranged to discharge said solution into the gas in said casing above said sump with sufficient force to propel said gas through said casing as a stream and to transfer by evaporation from the droplets projected into said stream of gas by said nozzle to said stream of gas mixed vapors of water and organic substance with said droplets discharged by said spray nozzle being returned to said body of solution for recirculation through said spray nozzle, a heater arranged to heat the solution being recirculated by said pump to a temperature above the initial dewpoint temperature of said stream of gas and not substantially higher than the normal boiling point of water, and a reflux heat exchanger arranged to conduct the portions of said stream of gas approaching and leaving said spray through opposite sides of said heat exchanger in indirect heat exchange relation to each other thereby to heat the portion of said stream of gas approaching said spray and to cool the portion of the stream of gas leaving said spray below its dew point thereby to condense substantially all the organic substance from the gas leaving said spray in the form of an aqueous solution thereof.

5. A concentrator for concentrating aqueous solutions of hygroscopic organic substances having boiling points higher than the normal boiling point of water without substantial loss of the substance, which comprises a casing having a vertical central partition providing downflow and upflow air passes in communication with each other at their lower ends and the bottom of said casing also forming a sump arranged to contain a body of the solution to be concentrated, an air inlet at the upper end of said downflow pass, an air outlet at the upper end of said upflow pass, a spray nozzle in said downflow pass and arranged to discharge said solution in the form of droplets into the air stream passing through said downflow pass for evaporation from the droplets projected into said stream of gas by said nozzle with said droplets discharged by said spray nozzle being collected in said sump, a liquid pump having its inlet connected with said sump and its outlet connected with said spray nozzle to recirculate a stream of said solution through said spray nozzle and sump, means arranged to supply a stream of the dilute solution to be concentrated to the solution being recirculated by said pump, a heater arranged to heat the solution being recirculated by said pump to a temperature above the initial dewpoint temperature of said stream of air and not substantially higher than the normal boiling point of water whereby the spray from said nozzle transfers by evaporation to said air stream mixed vapors of water and said organic substance and thereby concentrates, with respect to said organic substance the portion of said spray not evaporating, and a reflux heat exchanger in said casing connecting said air inlet with the upper end of said downflow pass and on its other side connecting said upflow pass with said air outlet thereby to pass the incoming and leaving portions of the stream of air flowing through said casing in indirect heat exchange relation to each other and to cool the stream of air leaving said casing below its dew point thereby to condense substantially all the organic substance from the leaving air in the form of an aqueous solution thereof and which flows back to said sump.

6. A concentrator for concentrating aqueous solutions of hygroscopic organic substances having boiling points higher than the normal boiling point of water without substantial loss of the substance, which comprises a casing having a vertical central partition providing downflow and upflow air passes in communication with each other at their lower ends and the bottom of said casing also forming a sump arranged to contain a body of the solution to be concentrated, an air inlet at the upper end of said downflow pass, an air outlet at the upper end of said upflow pass, a spray nozzle in said downflow pass and arranged to discharge said solution in the form of droplets into the air stream passing through said downflow pass for evaporation from the droplets projected into said stream of gas by said nozzle with said droplets discharged by said spray nozzle being collected in said sump, a liquid pump having its inlet connected with said sump and its outlet connected with said spray nozzle to recirculate a stream of said solution through said spray nozzle and sump, a small tank carried by said casing above said body of solution, means arranged to supply under pressure the dilute solution to be concentrated to said small tank, a float valve responsive to the level of the solution in said small tank and controlling the flow of said dilute solution to said small tank to maintain a constant level therein, a discharge pipe for said small tank and discharging into said sump, a metering orifice in said discharge pipe and providing a uniform rate of escape of said solution through said discharge pipe whereby said dilute solution to be concentrated is admitted to said sump at a constant rate, a heater arranged to heat the solution being recirculated by said pump to a temperature above the initial dewpoint temperature of said stream of air and not substantially higher than the normal boiling point of water whereby the spray from said nozzle transfers by evaporation to said air stream mixed vapors of water and said organic substance and thereby concentrates, with respect to said organic substance, the portion of said spray not evaporating, and a heat exchanger between the upper end of said upflow pass and said air outlet and through which said air containing said mixed vapors passes and is cooled below its dew point thereby to condense substantially all the organic substance from the air containing said mixed vapors in the form of an aqueous solution thereof and which flows back to said sump.

References Cited in the file of this patent

UNITED STATES PATENTS

| | | |
|---|---|---|
| 980,108 | Lillie | Dec. 27, 1910 |
| 2,077,554 | Fleisher | Apr. 20, 1937 |
| 2,088,962 | Kleucker | Aug. 3, 1937 |
| 2,162,158 | Coey | June 13, 1939 |
| 2,192,126 | Downs | Feb. 27, 1940 |
| 2,237,332 | Bretzloff et al. | Apr. 8, 1941 |
| 2,327,039 | Heath | Aug. 17, 1943 |
| 2,358,559 | Clemens | Sept. 19, 1944 |
| 2,367,695 | Spiselman | Jan. 23, 1945 |
| 2,535,008 | Crawford | Dec. 19, 1950 |